(12) United States Patent
Chang

(10) Patent No.: US 6,866,280 B2
(45) Date of Patent: Mar. 15, 2005

(54) PROCESS FOR MAKING A BICYCLE FRAME PART, AND BICYCLE FRAME INCLUDING THE BICYCLE FRAME PART

(75) Inventor: Owen Chang, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 10/698,469

(22) Filed: Nov. 3, 2003

(65) Prior Publication Data

US 2004/0130122 A1 Jul. 8, 2004

Related U.S. Application Data

(62) Division of application No. 10/102,123, filed on Mar. 20, 2002, now abandoned.

(51) Int. Cl.[7] ............................................. B62K 9/00
(52) U.S. Cl. ................................... 280/281.1; 72/58
(58) Field of Search ...................... 72/61, 58, 62; 280/281.1

(56) References Cited

U.S. PATENT DOCUMENTS

| | | | | |
|---|---|---|---|---|
| 2,203,868 A | * | 6/1940 | Gray et al. ........................ | 72/58 |
| 3,670,545 A | * | 6/1972 | Kent et al. ........................ | 72/58 |
| 4,051,704 A | * | 10/1977 | Kimura ............................ | 72/58 |
| 4,305,269 A | * | 12/1981 | Kimura ............................ | 72/58 |
| 4,484,756 A | * | 11/1984 | Takamiya et al. ............ | 280/281.1 |
| 4,580,427 A | * | 4/1986 | Akamatsu ........................ | 72/62 |
| 5,097,689 A | * | 3/1992 | Pietrobon ........................ | 72/58 |
| 5,253,890 A | * | 10/1993 | Takamiya et al. ............ | 280/281.1 |
| 5,435,163 A | * | 7/1995 | Schafer .......................... | 72/58 |

* cited by examiner

Primary Examiner—Lesley D. Morris
Assistant Examiner—Paul Royal, Jr.
(74) Attorney, Agent, or Firm—Harness, Dickey & Pierce, P.L.C.

(57) ABSTRACT

A bicycle frame part made via a process that includes the steps of placing a one-piece metallic tube blank in a die; hydraulically forming the tube blank by introducing a hydraulic pressure into the tube blank to deform and expand the tube blank so as to form at least one expanded wall part projecting from the tube blank along a direction different from the direction of extension of the tube blank; and machining the expanded wall part to form a connection tube. A bicycle frame includes a plurality of frame parts connected to each other. At least one of the frame parts is formed via the aforementioned process, and includes a tube body and at least one connection tube projecting from the tube body in a direction different from the direction of extension of the tube body.

2 Claims, 10 Drawing Sheets

PROCESS FOR MAKING A BICYCLE FRAME PART, AND BICYCLE FRAME INCLUDING THE BICYCLE FRAME PART

This application is a divisional of Application No. 10/102,123, filed on Mar. 20, 2002, now abandoned, the entire contents of which are hereby incorporated by reference and for which priority is claimed under 35 U.S.C. § 120.

BACKGROUND OF THE INVENTION

1. Field of the Invention

The invention relates to a process for making a bicycle frame part, more particularly to a process for making a bicycle frame part having an appearance free of welding scars. The invention also relates to a bicycle frame including a bicycle frame part produced according to the process.

2. Description of the Related Art

Referring to FIG. 1, a conventional bicycle frame 10 essentially includes a head tube 11, a seat tube 12, a five-way connector 13, a cross bar 14, a down tube 15, a seat stay 16 and a chain stay 17. The conventional bicycle frame 10 is usually constructed by welding the aforementioned bicycle frame parts to each other. However, the conventional bicycle frame 10 has a lot of welding scars formed at the joints of the welded bicycle frame parts, which affect the appearance of the bicycle frame. The welding process also increases the manufacturing cost and limits the flexibility in the design of the bicycle frame.

Although a bicycle frame made of carbon fiber can be made via an integral-forming process, the manufacturing cost thereof is relatively high.

SUMMARY OF THE INVENTION

Therefore, an object of the present invention is to provide a process for making a bicycle frame part having an appearance free of welding scars.

Another object of the invention is to provide a bicycle frame having a bicycle frame part produced according to the process.

The process for making a bicycle frame part according to this invention includes the steps of: placing a one-piece metallic tube blank in a die; hydraulically forming the tube blank by introducing a hydraulic pressure into the tube blank to deform and expand the tube blank so as to form at least one expanded wall part projecting from the tube blank along a direction different from the direction of extension of the tube blank; and machining the expanded wall part to form a connection tube.

The bicycle frame according to this invention includes a plurality of frame parts connected to each other. At least one of the frame parts is formed via the aforementioned process, and includes a tube body and at least one connection tube projecting from the tube body in a direction different from the direction of extension of the tube body.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
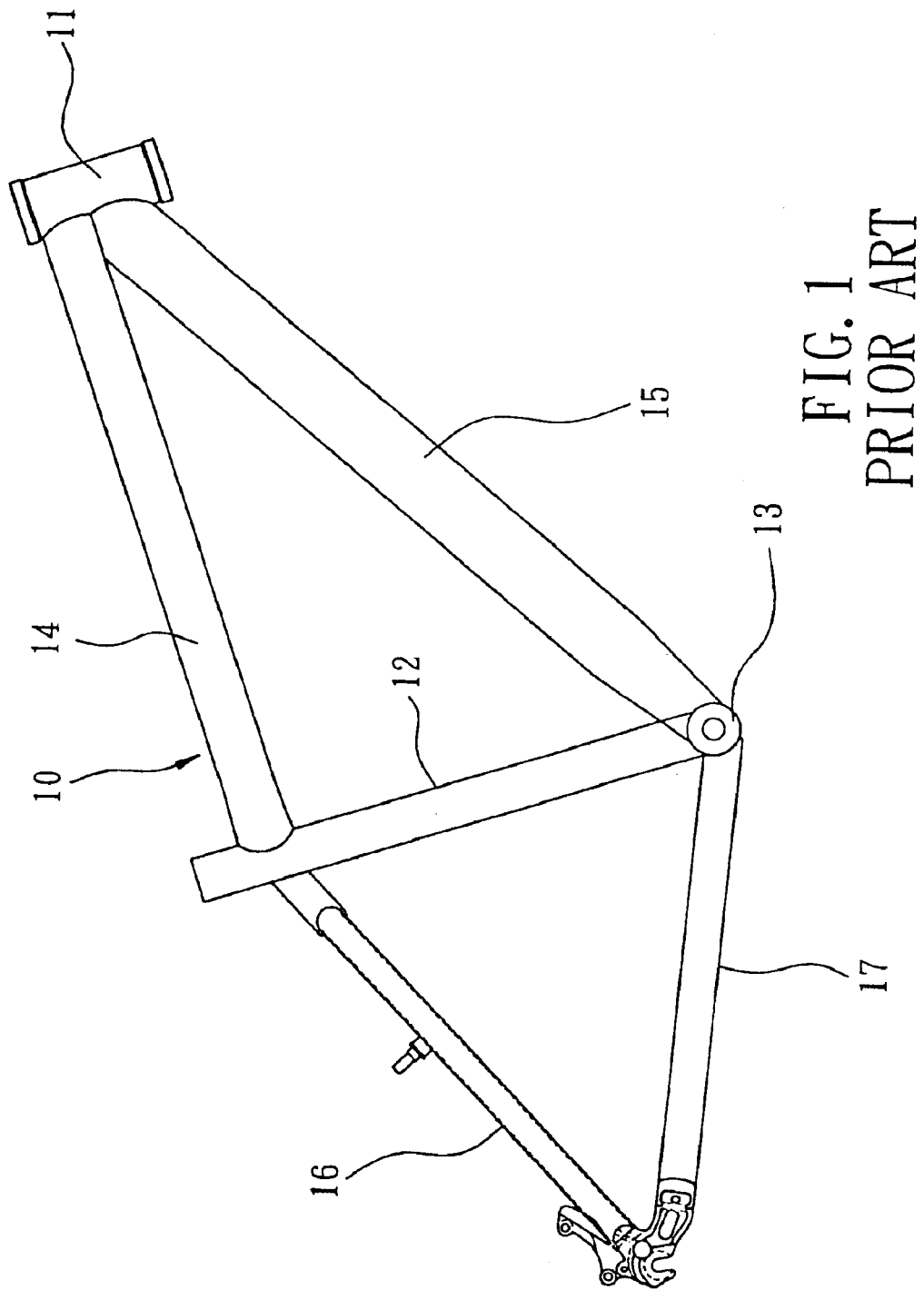
FIG. 1 is a schematic view of a conventional bicycle frame.
Figure 2:
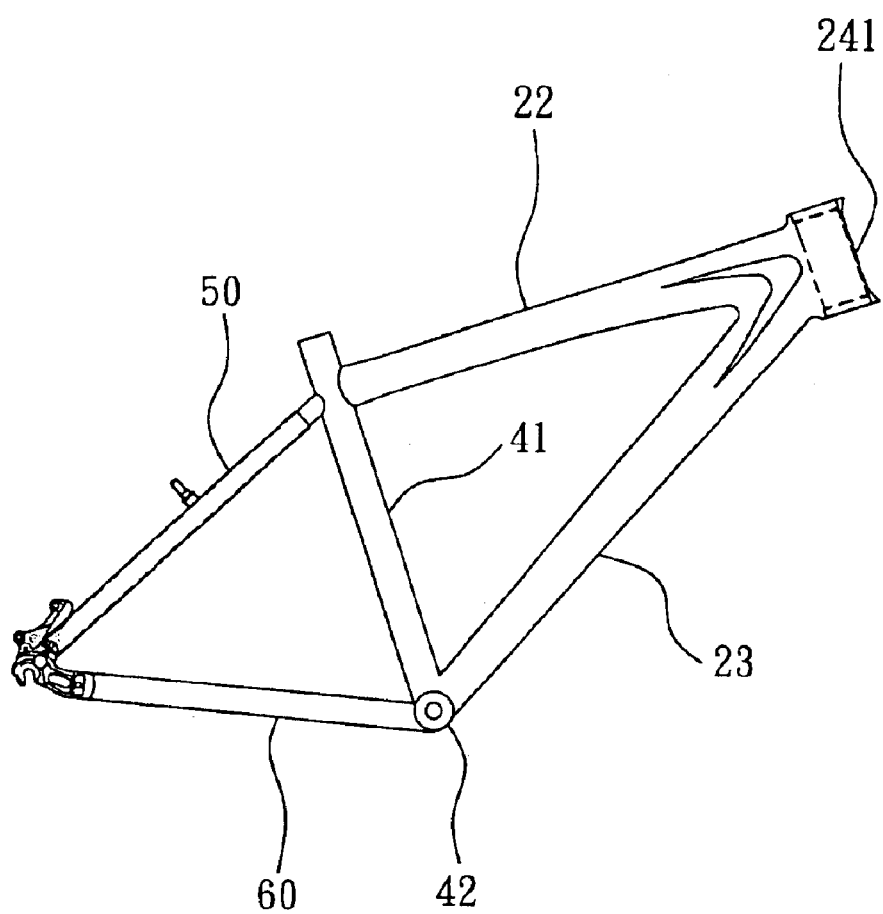
FIG. 2 is a schematic view of the preferred embodiment of the bicycle frame according to this invention.
Figure 2A:
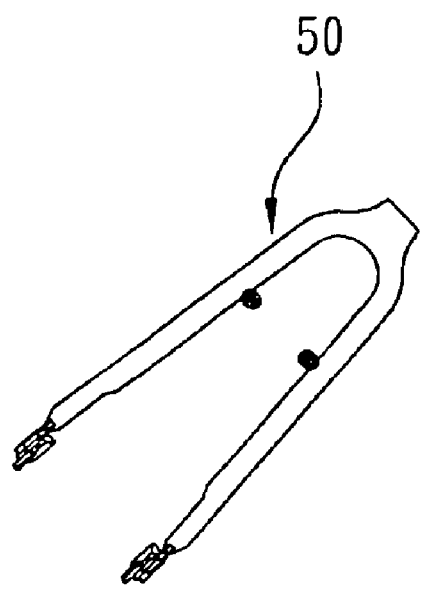
FIG. 2A is a schematic view of a seat stay of the bicycle frame of FIG. 2.
Figure 2B:
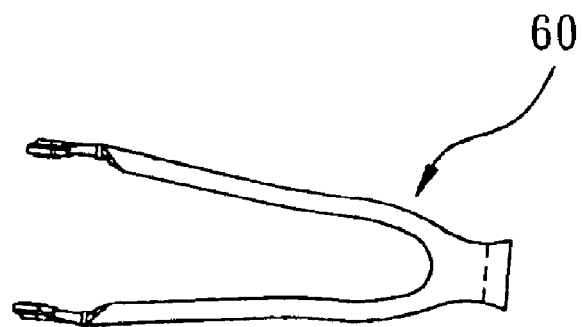
FIG. 2B is a schematic view of a chain stay of the bicycle frame of FIG. 2.

Referring to FIGS. 2, 2A and 2B, the preferred embodiment of the bicycle frame according to this invention includes a plurality of bicycle frame parts, such as a head tube 241 integrated with a cross bar 22 and a down tube 23 to form a one-piece unitary unit, a seat tube 41, a five-way connector 42, a seat stay 50, and a chain stay 60, which are connected to each other to form the bicycle frame. Some of the bicycle frame parts, such as the one-piece unitary unit, the seat stay 50 and the chain stay 60 can be made by the process for making a bicycle frame part according to this invention.

Figure 3:
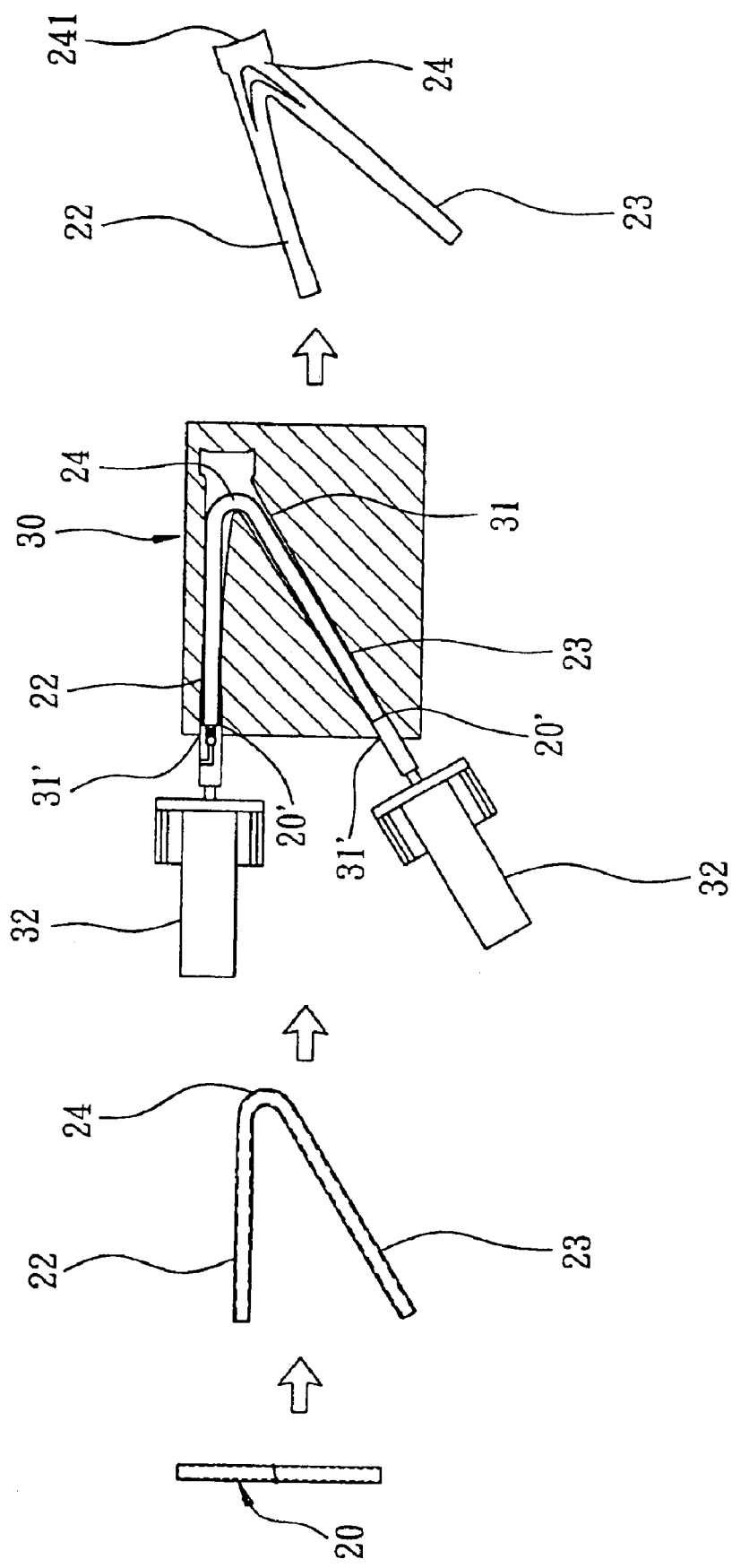
FIG. 3 illustrates consecutive steps of the preferred embodiment of the process for making a bicycle frame part according to this invention.

Referring to FIG. 3, which illustrates the preferred embodiment of the process of the invention for making the one-piece unitary unit, a one-piece metallic tube blank 20, which is preferably made of an aluminum alloy, is bent to form a turn 24 and two tube sections 22, 23 at two sides of the turn 24. The tube sections 22, 23 form an acute angle therebetween. The bent tube blank 20 is then placed in a die 30 provided with a die cavity 31 and two die openings 31' communicated with the die cavity 31. When the tube blank 20 is placed in the die cavity 31, two open ends 20' of the tube blank 20 are aligned and communicated respectively with the die openings 31'. The tube blank 20 is then hydraulically formed by introducing a hydraulic pressure from hydraulic cylinders 32 into the tube blank 20 through both of the die openings 31' and through both of the open ends 20' of the tube blank 20 to deform and expand the tube blank 20 at the turn 24 so as to form an expanded wall part 241 projecting from the tube blank 20 along a direction different from the direction of extension of the tube blank 20. The tube sections 22, 23 are formed into the cross bar 22 and the down tube 23. The expanded wall part 241 is then machined by drilling to form two openings at two opposite ends of the expanded wall part 241, which are opposed to one another along a direction transverse to the tube sections 22, 23, thereby forming the expanded wall part 241 into a connection tube that serves as the head tube 241. The one-piece unitary unit further includes an insert tube 243 fitted inside the expanded wall part 241.

Figure 4:
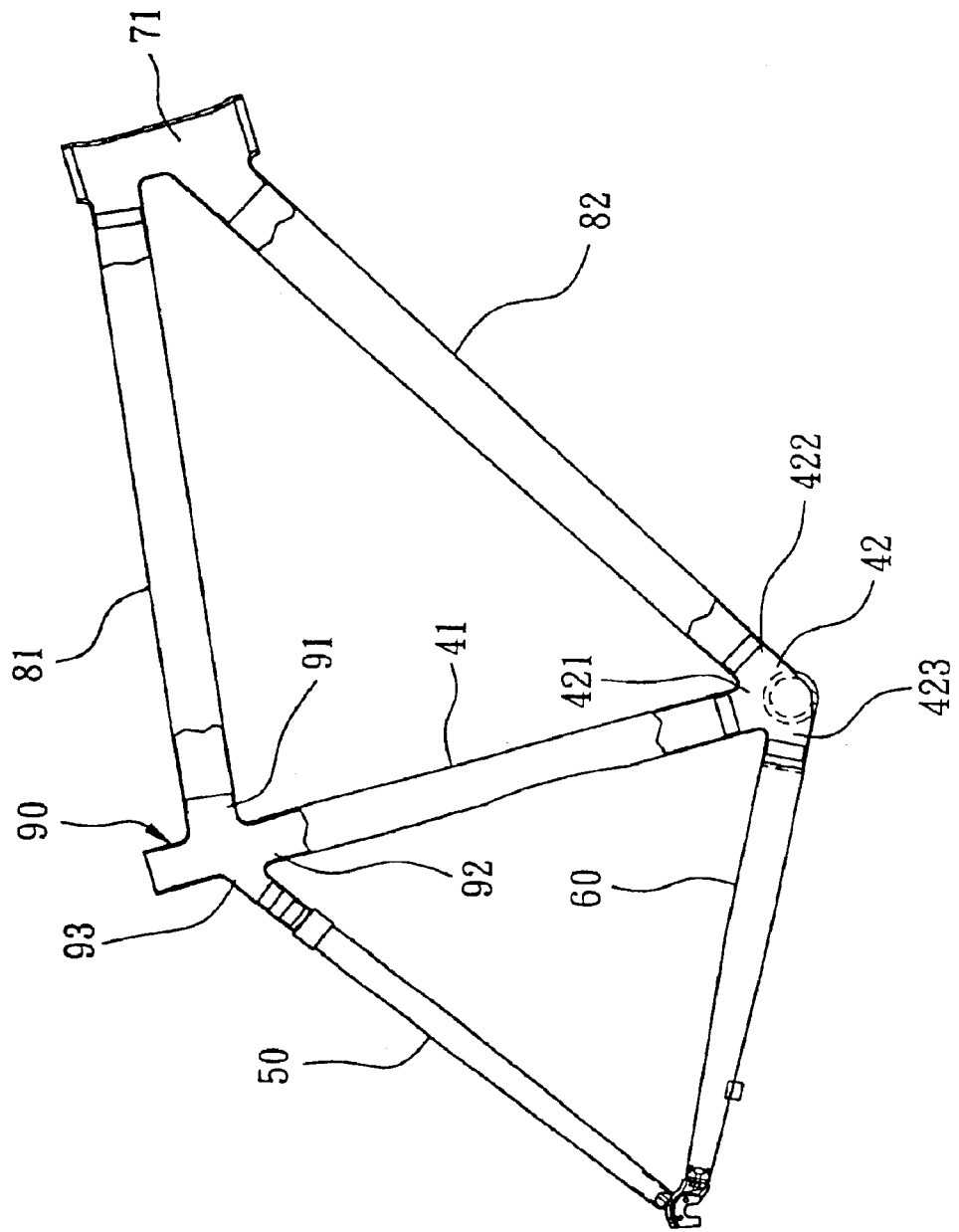
FIG. 4 is a schematic view of another preferred embodiment of the bicycle frame according to this invention.
Figure 4A:
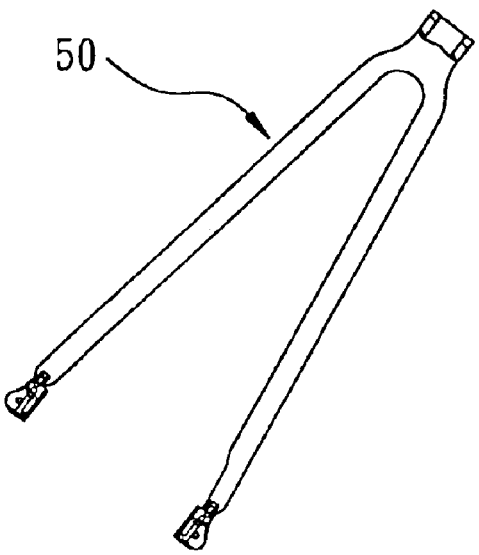
FIG. 4A is a schematic view of a seat stay of the bicycle frame of FIG. 4.
Figure 4B:
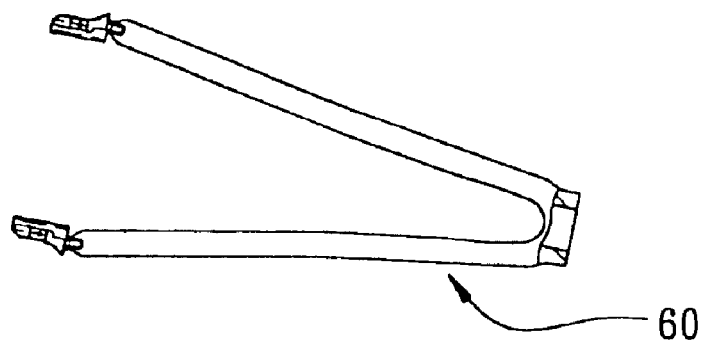
FIG. 4B is a schematic view of a chain stay of the bicycle frame of FIG. 4.

Referring to FIGS. 4, 4A and 4B, another preferred embodiment of the bicycle frame according to this invention is shown to include the bicycle frame parts, such as a cross bar 81, a down tube 82, a seat tube 41, a seat stay 50, a chain stay 60, a first connector 90 interconnecting the cross bar 81, the seat tube 41, and the seat stay 50, a second connector 42 fixed to the seat tube 41 opposite to the first connector 90 and interconnecting the down tube 82, the seat tube 41 and the chain stay 60, and a head tube 71 connected to the cross bar 81 and the down tube 82 opposite to the first and second connectors 90, 42. The bicycle frame parts, such as the head tube 71, the first connector 90 and the second connector 42, of this preferred embodiment can be made by another preferred embodiment of the process for making a bicycle frame part according to this invention as shown in FIGS. 4, 5 and 6.

Figure 5:
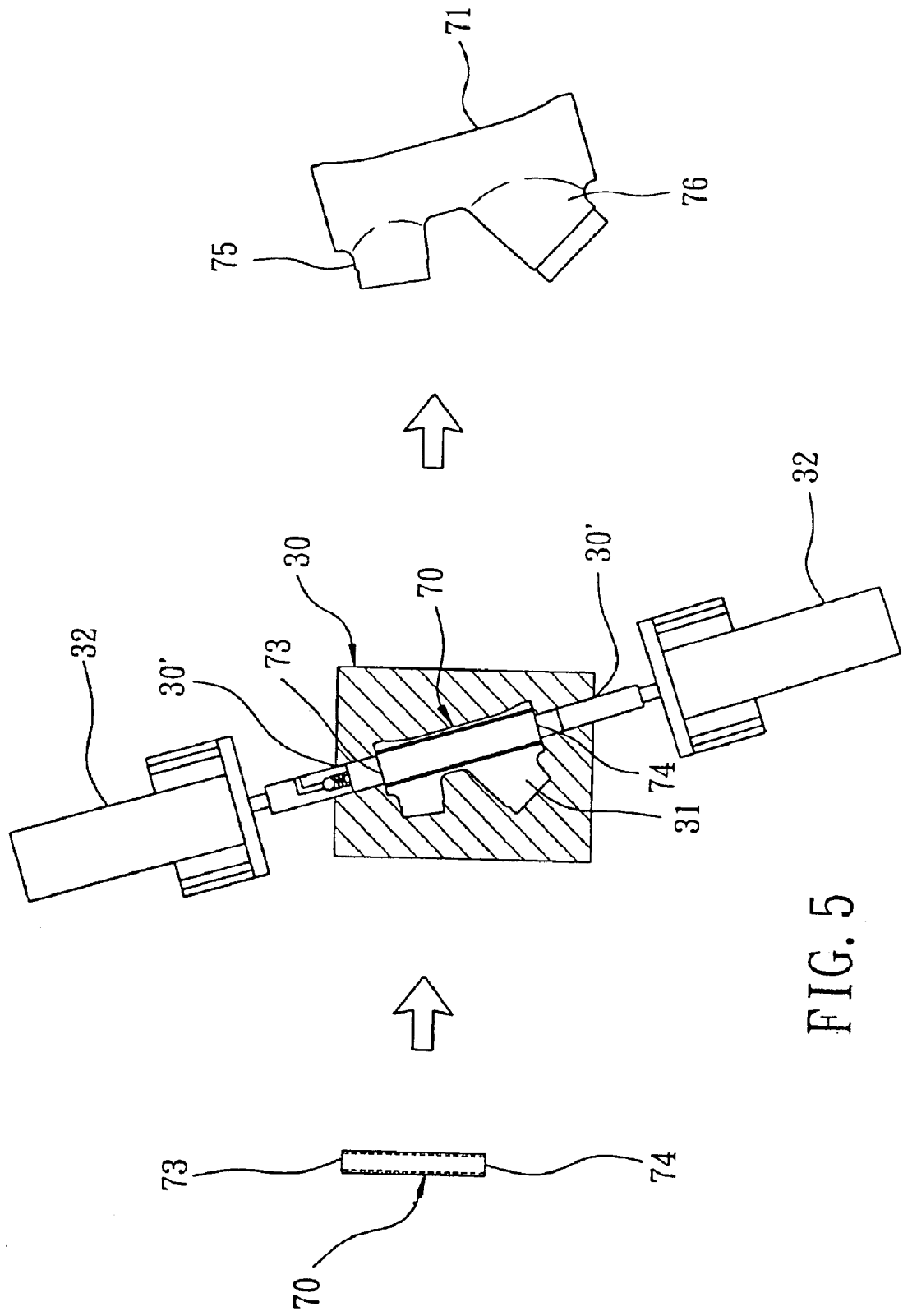
FIGS. 5, 6, and 7 illustrate consecutive steps of another preferred embodiment of the process for making a head tube, a first connector, and a second connector of a bicycle frame according to this invention, respectively.

Referring to FIG. 5, which illustrates the preferred embodiment of the process for making the head tube 71 of the bicycle frame according to this invention, a substantially straight one-piece metallic tube blank 70, which is preferably made of an aluminum alloy, is placed in a die 30 which is provided with a die cavity 31 and two die openings 30' communicated with the die cavity 31. When the tube blank 70 is placed in the die cavity 31, opposite open ends 73, 74 of the tube blank 70 are aligned and communicated respectively with the die openings 30'. The tube blank 70 is hydraulically formed by introducing a hydraulic pressure from hydraulic cylinders 32 into the tube blank 70 through both of the die openings 30' and through both of the open ends 73, 74 of the tube blank 70 to deform and expand the tube blank 70 so as to form two expanded wall parts 75, 76 projecting in two different direction from two axially aligned and spaced apart locations of the tube blank 70. Each of the expanded wall parts 75, 76 is machined to form a connection tube.

Figure 6:
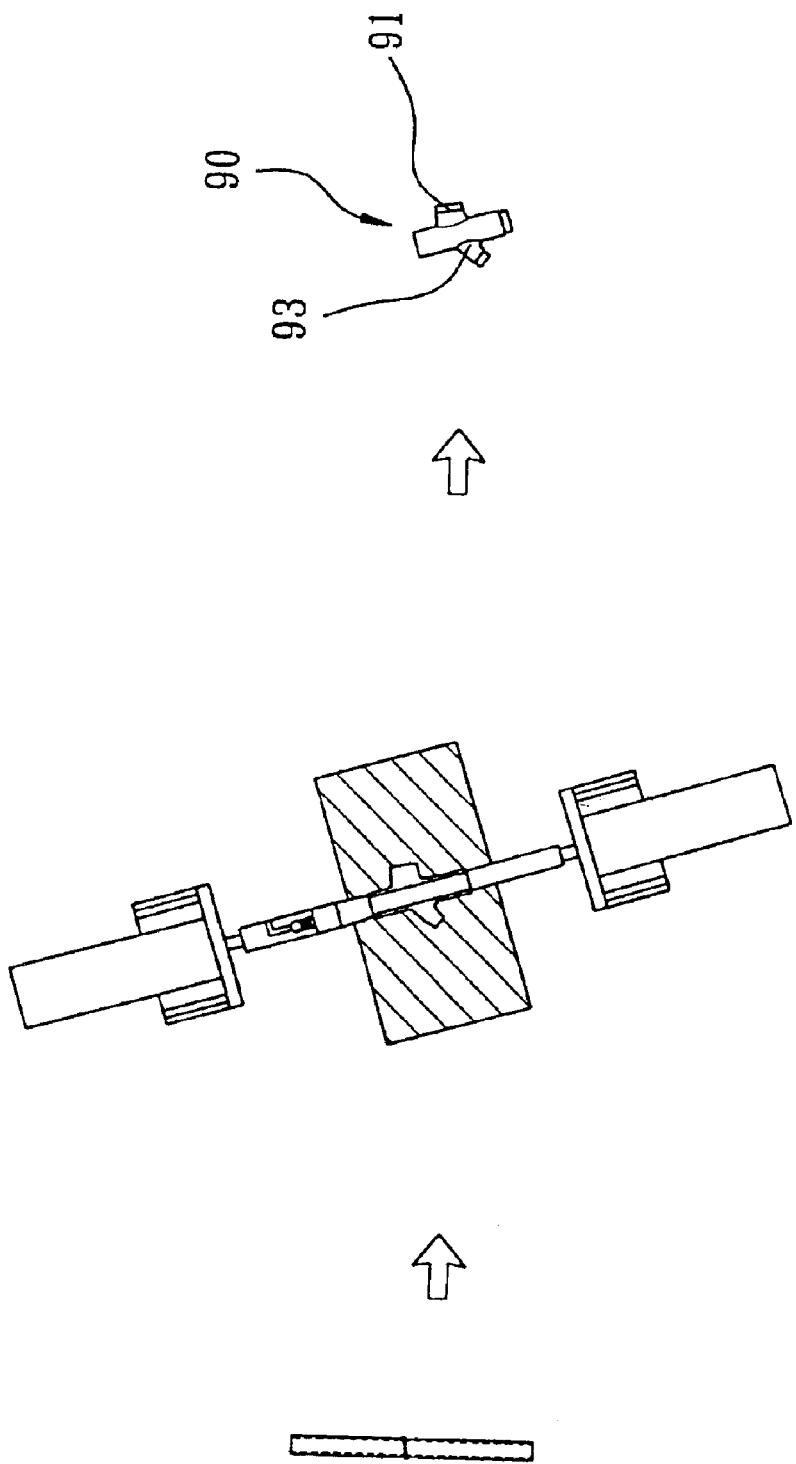
Figure 7:
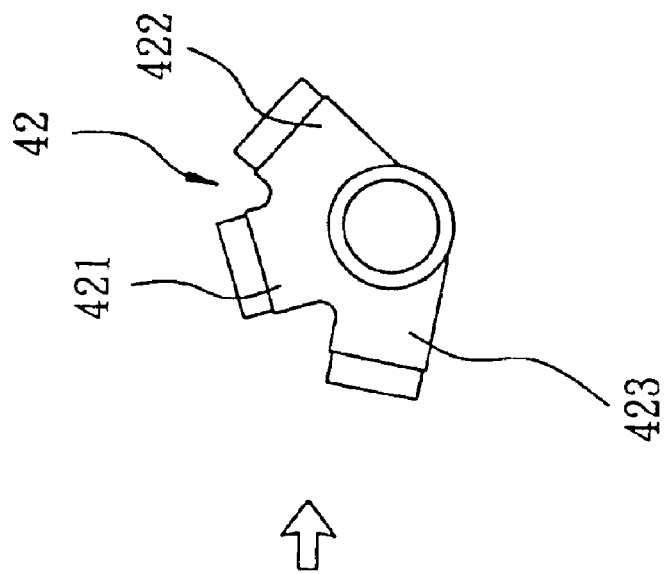
Figure 7:
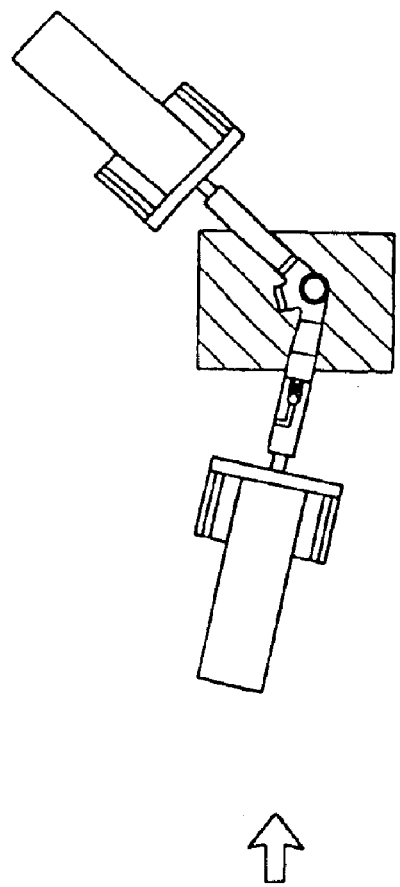
Figure 7:
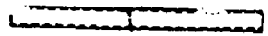

FIGS. 6 and 7 illustrate the preferred embodiment of the processes for making the first connector 90 and the second connector 42 according to this invention, respectively, which are similar to that shown in FIG. 5, except that the projecting direction and/or the number of the expanded wall parts of the first connector 90 and the second connector 42 are different from those of the head tube 71.

Figure 8:
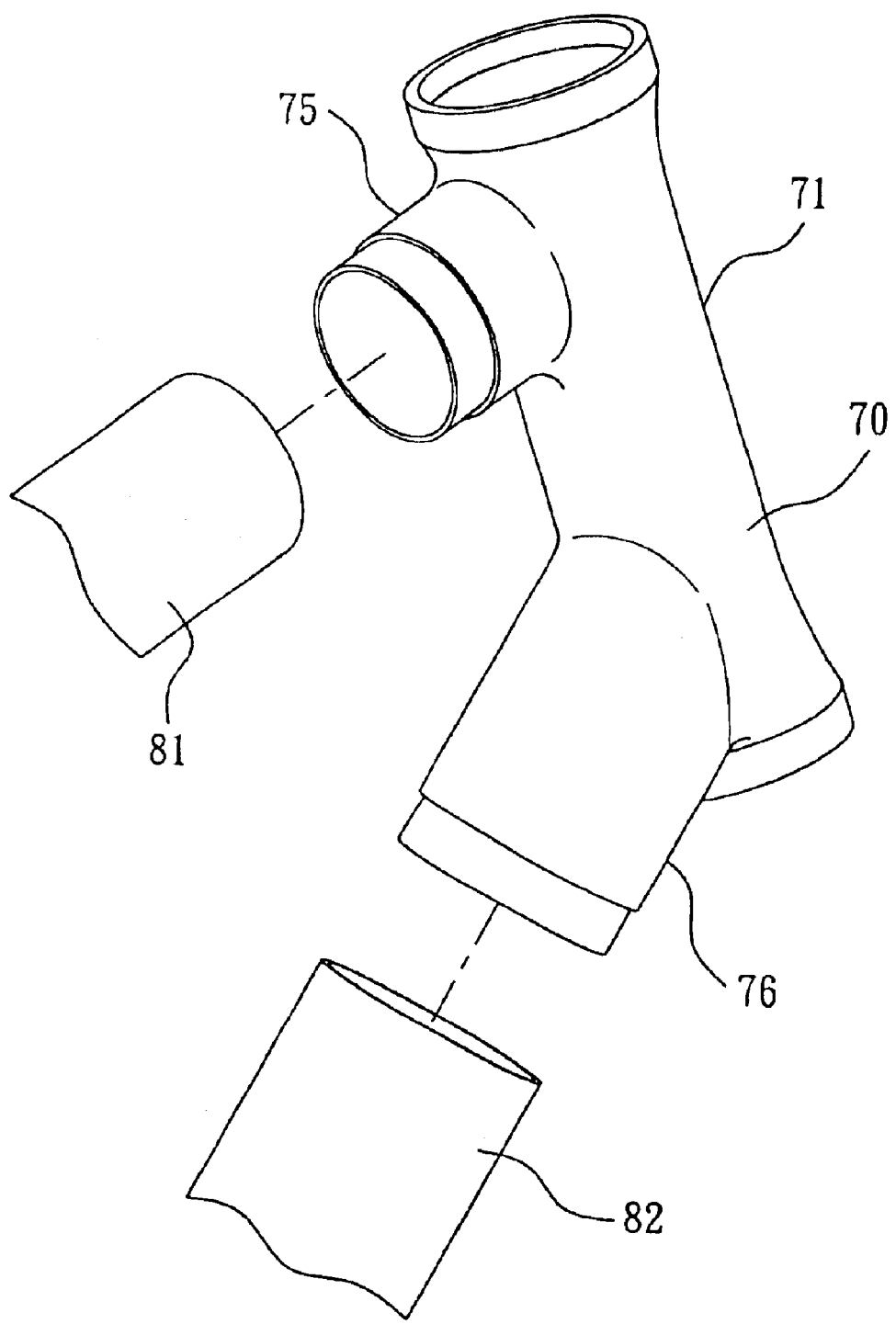
FIG. 8 is a perspective view of a head tube produced by the preferred embodiment of FIG. 5.

FIG. 8 shows the head tube 71 made according to the process shown in FIG. 5. The head tube 71 has a pair of the connection parts 75, 76 projecting from the tube body 70 and to be connected respectively to the cross bar 81 and the down tube 82, as shown in FIG. 4.

Referring to FIG. 6, the first connector 90 made according to this preferred embodiment includes two connection tubes 91, 93 which can be connected respectively to the cross bar 81 and the seat stay 82, as shown in FIG. 4.

Referring to FIG. 7, the second connector 42 made according to this preferred embodiment includes three connection tubes 421, 422, 423 which can be connected respectively to the seat tube 41, the down tube 82, and the chain stay 60, as shown in FIG. 4.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:
1. A bicycle frame comprising:
   a plurality of frame parts which are connected to each other;
   at least one of said frame parts including a tube body and at least one connection tube projecting from said tube body in a direction different from the direction of extension of said tube body;
   said at least one of said frame parts being formed via a process which comprises hydraulically forming a one-piece metallic tube blank by introducing a hydraulic pressure into said tube blank to deform and expand said tube blank so as to form at least one expanded wall part projecting from said tube blank in a direction different from the direction of extension of said tube blank, and machining said expanded wall part to form said connection tube; and
   wherein said frame parts include a one-piece unitary unit composed of a cross bar, a down tube, and head tube, said one-piece unitary unit being formed via said process, in which said process further includes the step of bending said tube blank to form two tube sections which form an acute angle therebetween and a turn between said tube sections, said tube blank being hydraulically formed such that said tube sections are formed into said cross bar and said down tube and such that said expanded wall part projects from said turn away form said tube sections to form said head tube, said expanded wall part being machined to form two openings at two opposite ends of said expanded wall part, which are opposed to one another along a direction transverse to said tube sections.

2. The bicycle frame as claimed in claim 1, wherein said one-piece unitary unit further includes an insert-tube fitted inside said expanded wall part along said direction.

* * * * *